United States Patent [19]
Kim et al.

[11] Patent Number: 5,668,613
[45] Date of Patent: Sep. 16, 1997

[54] LIQUID CRYSTAL DISPLAY WITH A PLURALITY OF CONTIGUOUS PIXELS OR PIXEL GROUPS WITH THE SAME OR DIFFERENT STORAGE CAPACITANCES

[75] Inventors: Dong-Gyu Kim, Kyungki-do; Sang-Soo Kim, Seoul, both of Rep. of Korea

[73] Assignee: Samsung Electronics Co., Ltd., Suwon, Rep. of Korea

[21] Appl. No.: 658,822

[22] Filed: May 31, 1996

[30] Foreign Application Priority Data

May 31, 1995 [KR] Rep. of Korea ................. 95-14245

[51] Int. Cl.$^6$ ................. G02F 1/1343; G02F 1/136
[52] U.S. Cl. ................. 349/38; 349/39; 349/42; 349/43; 349/46
[58] Field of Search ................. 349/38, 39, 42, 349/43; 365/149

[56] References Cited

U.S. PATENT DOCUMENTS 5,159,476  10/1992  Hayashi ................. 359/54
5,369,512  11/1994  Yanai et al. ................. 359/59
5,406,511   4/1995  Nogami ................. 365/149
5,457,553  10/1995  Mori ................. 359/59
5,519,521   5/1996  Okimoto et al. ................. 359/59

Primary Examiner—William L. Sikes
Assistant Examiner—Julie Ngo
Attorney, Agent, or Firm—Cushman Darby & Cushman, IP Group of Pillsbury Madison & Sutro LLP

[57] ABSTRACT

The liquid crystal display (LCD) according to the present invention has a plurality of pixels with different storage capacitances. In particular, the contiguous pixels have different storage capacitances. The storage capacitor has two electrodes, one of which is a pixel electrode and the other of which is a storage electrode. Since the storage capacitance is proportional to the overlapping area of the pixel electrode and the storage electrode, the storage capacitance is controlled by controlling the overlapping area. The different storage capacitances enables the LCD to have improved viewing characteristics.

20 Claims, 9 Drawing Sheets

LIQUID CRYSTAL DISPLAY WITH A PLURALITY OF CONTIGUOUS PIXELS OR PIXEL GROUPS WITH THE SAME OR DIFFERENT STORAGE CAPACITANCES

BACKGROUND OF THE INVENTION

1. Field of the Invention

The present invention relates to a liquid crystal display (hereinafter referred to as an LCD), in particular, a liquid crystal display having a plurality of pixels with different storage capacitances.

2. Description of the Related Art

A thin film transistor (hereinafter referred to as TFT) LCD has a TFT as a switching element. The TFT LCD has a TFT array panel, a common panel and liquid crystal material therebetween. The TFT array panel includes a plurality of pixels each of which has a TFT and a pixel electrode, and the common panel includes a common electrode.

The LCD, particularly in twisted nematic (hereinafter referred to as TN) mode, has a narrow viewing angle and the optical transmission rate depending on the viewing angle. This dependence is due to the characteristics of the liquid crystal molecule and is greater upward and downward than right and left, causing the asymmetrical viewing characteristics.

In order to obtain a wider viewing angle, several approaches are suggested.

Kaneko et al. disclose several methods for obtaining wide viewing angle, in "Wide-Viewing-Angle Improvements for AMLCDs", SID 93 DIGEST pp. 265–268, such as film compensated TN cells, pixel divided TN cells, multi-domain TN cells, and TN cells using subpixels.

The TN cells using subpixels will be described with reference to FIG. 1A to 1C. A pixel is divided into three subpixels with different control capacitors $C_{S2}$ and $C_{S3}$. FIG. 1A is an equivalent circuit for the pixel with subpixels, FIG. 1B shows the plane structure of the pixel, and FIG. 1C shows the cross-sectional view of the pixel.

As shown in FIG. 1C, a gate electrode 2 is formed on a lower transparent substrate 1 and a first insulating layer 4 is deposited thereon. A first transparent electrode 5 is formed on the first insulating layer 4 and connected to a TFT. A second insulating layer 14 and a second transparent electrode 15 is formed on the part of the first transparent electrode 5, and a third insulating layer 24 and a third transparent electrode 25 is formed on the part of the second transparent electrode 15. A common electrode 10 is formed on a upper transparent substrate 9 opposite to the lower substrate 1.

The capacitance of a capacitor is inversely proportional to the distance between the electrodes of the capacitor and is proportional to the area of the electrodes. The conventional liquid crystal capacitor composed of a pixel electrode and a common electrode is divided into three liquid crystal sub-capacitors $C_{LC1}$, $C_{LC2}$ and $C_{LC3}$. The sub-capacitors $C_{LC1}$, $C_{LC2}$ and $C_{LC3}$ have the first, the second and the third transparent electrodes 5, 15 and 25 respectively as one electrode and the common electrode as the other electrode. Control capacitors $C_{S2}$ or $C_{S3}$ connected to the sub-capacitors $C_{LC2}$ and $C_{LC3}$ respectively in series act as voltage dividers and provide control voltages to the subpixels. The transparent electrodes 5, 15 and 25 are supplied with the same voltage, but the voltage $V_{LCi}$ applied between the two electrodes of the sub-capacitor $C_{LCi}$ (i=1, 2 and 3) are different from that of the other sub-capacitors. That is, the strength of the electric field applied into the liquid crystal in a subpixel is different from that in the other subpixels. In result, the pixel has domains with three different transmission rates and the resultant transmission rate of a pixel is the average value of the three transmission rates of the three subpixels. Therefore, the viewing characteristics of the LCD can be improved.

However, concerning the fabricating process, there is a disadvantage that the additional steps for forming the second and the third transparent electrodes, and the second and the third insulating layers.

SUMMARY OF THE INVENTION

An object of the present invention is to improve the viewing characteristics of an LCD without increasing the number of the steps for fabricating the LCD.

A liquid crystal display (LCD) according to the present invention has a plurality of pixel groups with different storage capacitances. Preferably, the contiguous pixels have different storage capacitances. The storage capacitor has two electrodes, one of which is a pixel electrode and the other of which is a storage electrode. Since the storage capacitance is proportional to the overlapping area of the pixel electrode and the storage electrode, the storage capacitance is controlled by varying the overlapping area. The pixel groups with different storage capacitances enables the LCD to have improved viewing characteristics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION OF THE PREFERRED EMBODIMENTS

As shown in FIG. 2 to 7, a plurality of pixels each of which has a storage capacitor, a liquid crystal capacitor and a TFT are arranged in a matrix form, and a plurality of gate lines $G_1, G_2, \ldots, G_i, \ldots$ (where i is an integer) and a plurality of data lines $D_1, D_2, \ldots, D_j, \ldots$ (where j is an integer) crossing the gate lines $G_1, G_2, \ldots, G_i, \ldots$ are arranged around the pixels. The capacitance of a storage capacitor, i.e., the storage capacitance takes one value among a plurality of values.

The gate port of a TFT is connected to a gate line, the source port of the TFT is connected to a data line, and the drain port of the TFT is connected to an electrode of a liquid crystal capacitor with capacitance $C_{LC}$ and to an electrode of a storage capacitor with capacitance $C_{S1}, C_{S2}, C_{S3}$ or $C_{S4}$.

The other electrode of the storage capacitor is connected to the storage electrode line 8.

A voltage Vp is applied an electrode of the liquid crystal capacitor as well as an electrode of the storage capacitor, and the common voltage Vcom is applied to the other electrode of the liquid crystal capacitor, as well as the other electrode of the storage capacitor. Instead of being applied with the common voltage Vcom, the other electrode of the storage capacitor is connected to the gate line in order to be applied with a gate voltage. In this case, it may be connected to the previous gate line.

As shown in FIG. 2 to 5, a pair of a gate line and a data line define a pixel which includes a TFT, a liquid crystal capacitor and a storage capacitor.

Figure 1A:
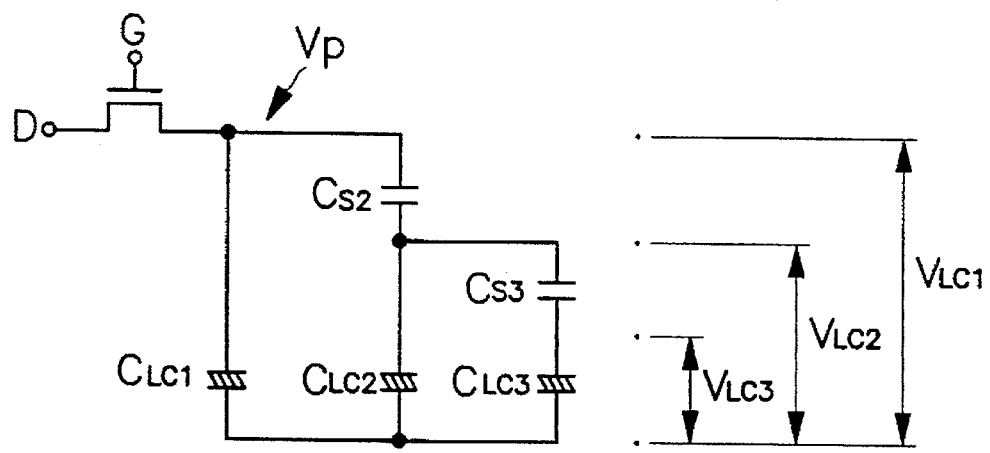
FIG. 1A to 1C shows a pixel of the conventional LCD.
Figure 1B:
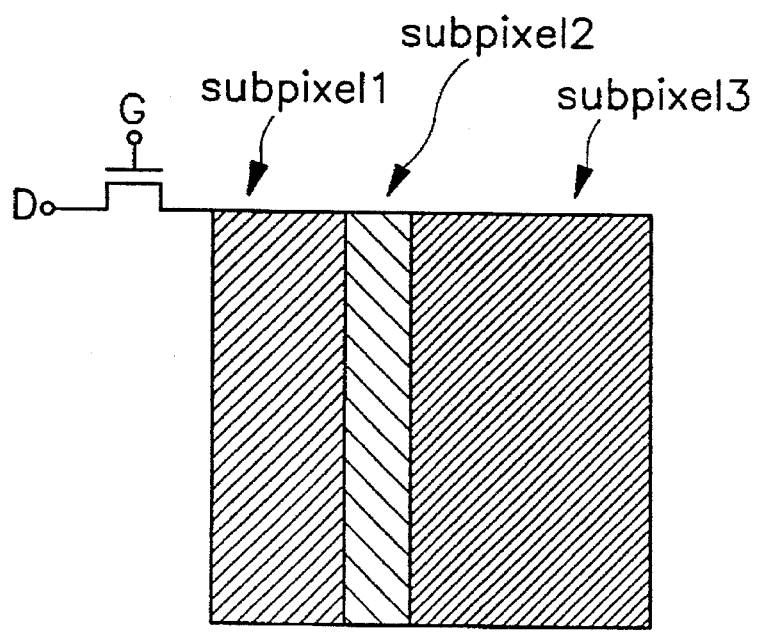
Figure 1C:
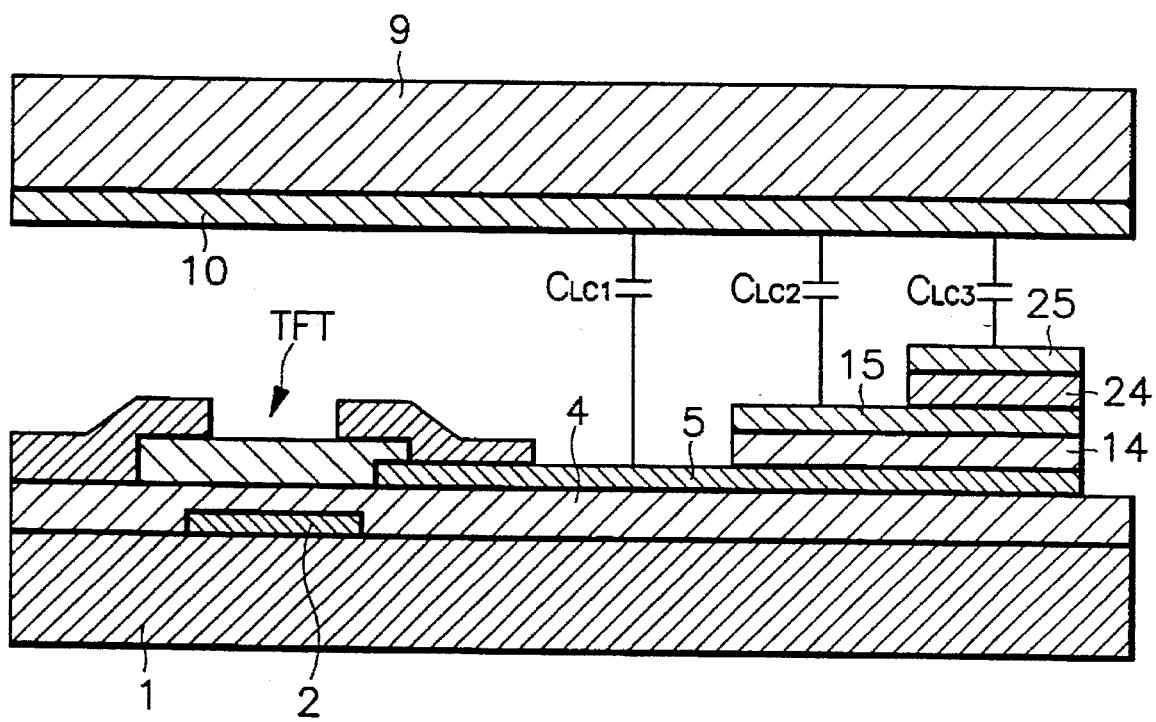
Figure 2:
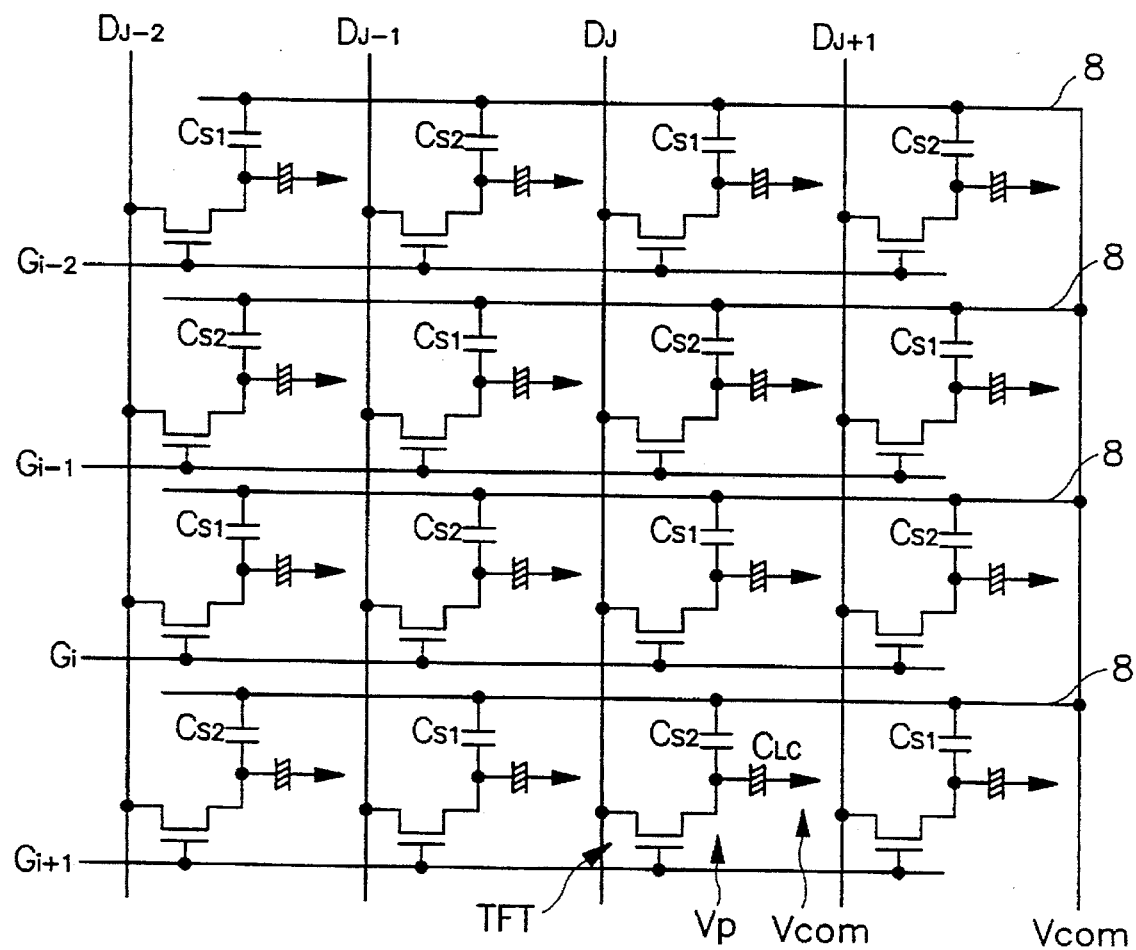
FIG. 2 to 7 are equivalent circuits according to the embodiments of the present invention.

FIG. 2 shows a structure in which each pixel has one of the two storage capacitances $C_{S1}$ and $C_{S2}$ and the contiguous pixels in a row or in a column have different storage capacitances.

Figure 3:
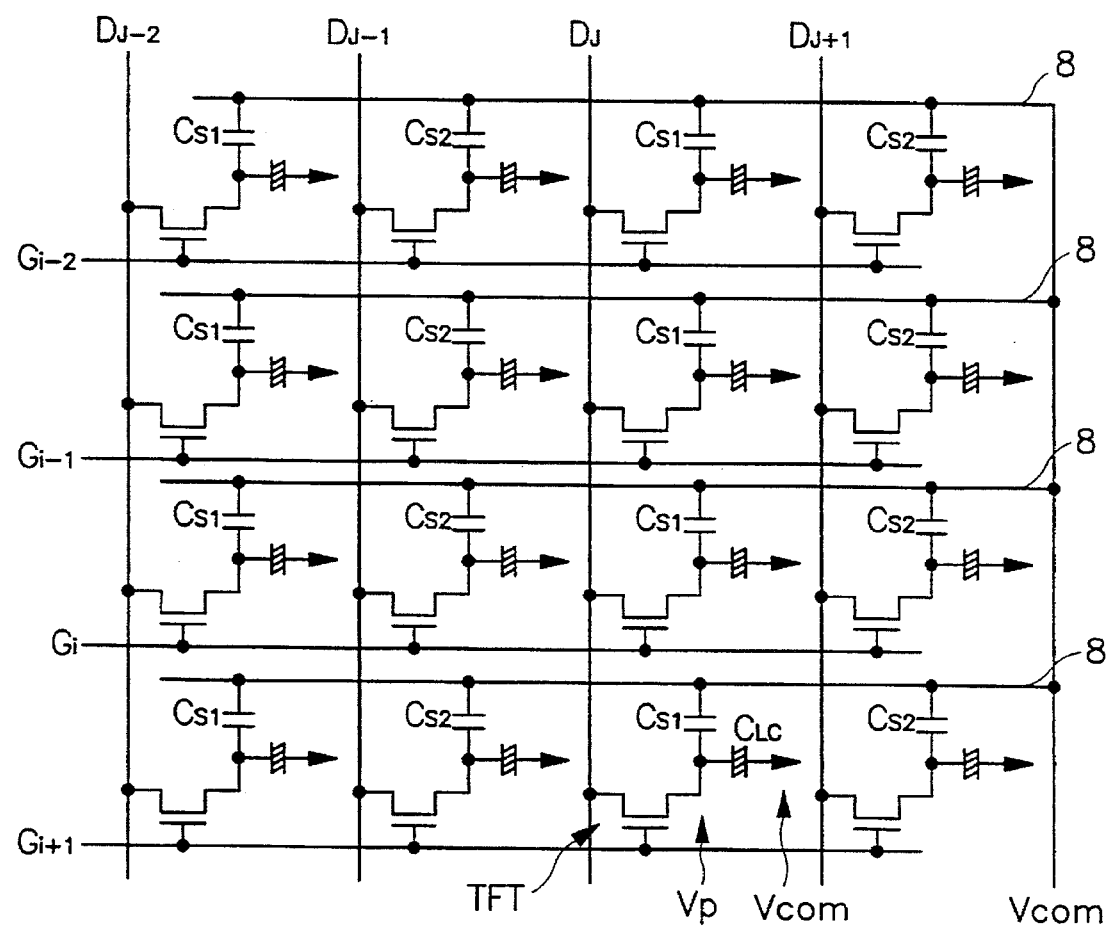
Figure 4:
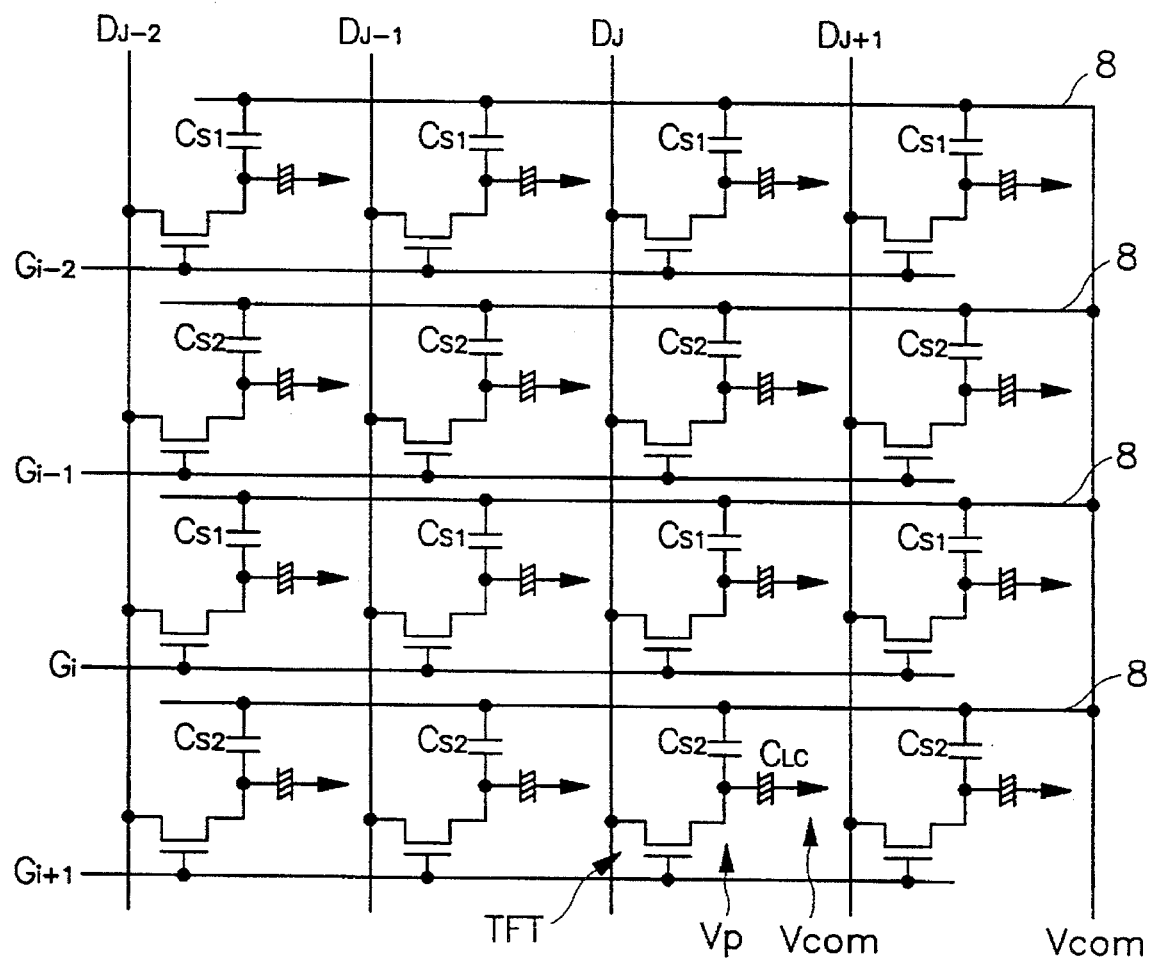

Each pixel shown in FIG. 3 and 4 has one of the two storage capacitance values $C_{S1}$ and $C_{S2}$. In FIG. 3, the pixels in a column has the same storage capacitance and the contiguous pixels in a row have different capacitances. In FIG. 4, the pixels in a row has the same storage capacitance and the contiguous pixels in a column have different capacitances.

Figure 5:
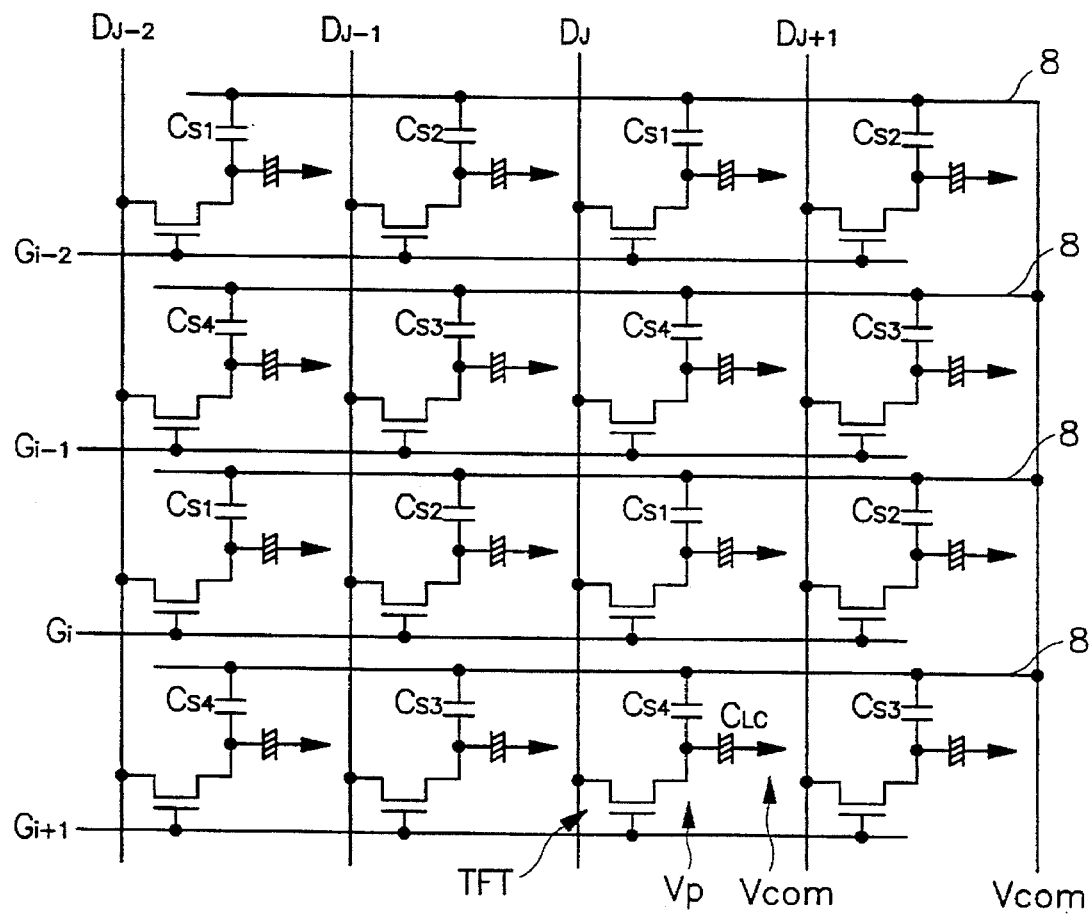

In FIG. 5, each pixel has a capacitance among one of the four values $C_{S1}$, $C_{S2}$, $C_{S3}$ and $C_{S4}$ and the four contiguous pixels have different capacitances.

Figure 6:
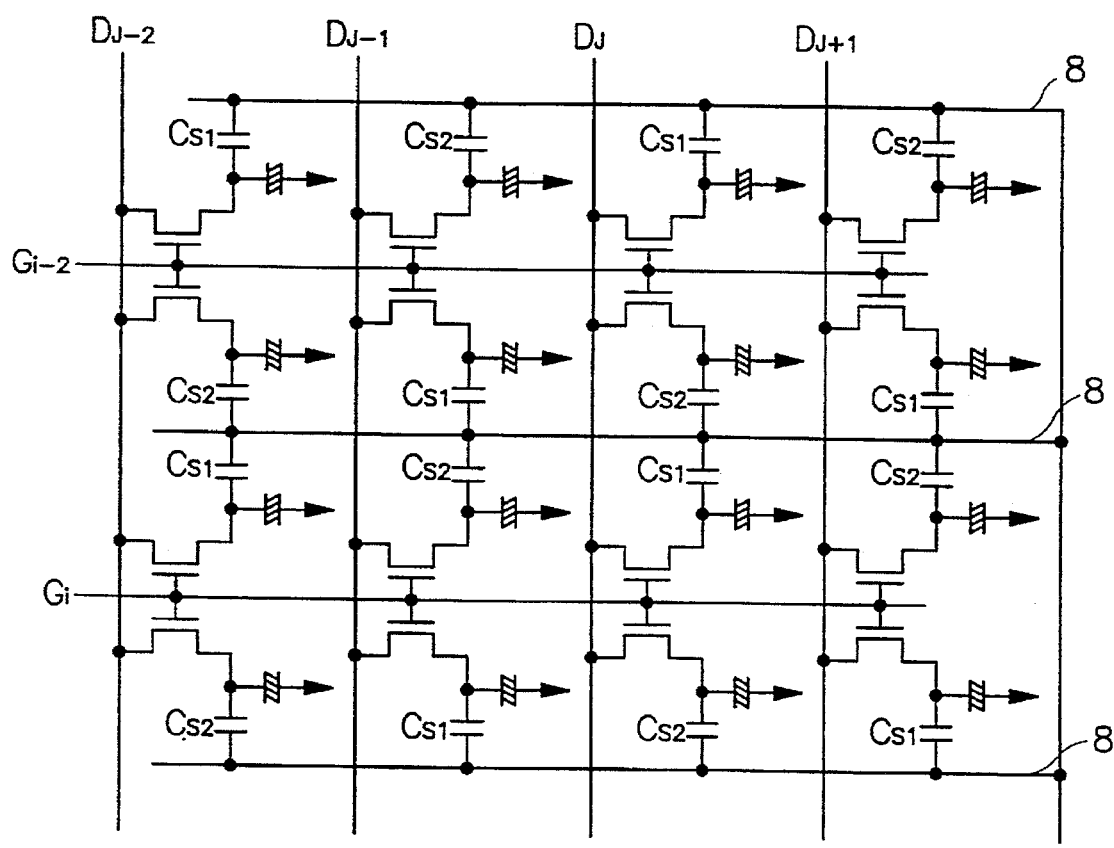

As shown in FIG. 6, a pair of a gate line and a data line define two pixels. Each pixel has one of the two storage capacitance values $C_{S1}$ and $C_{S2}$ and the contiguous pixels in a row or in a column have different storage capacitances. Since two contiguous pixels with different storage capacitances in a column are connected to a gate line and the pixels in a row are connected to the same gate line, the pixels in the two row which are connected to a gate line are simultaneously activated. Therefore, two pixels with different storage capacitances connected to a gate line are applied with the same data signal and thus the two pixels having different viewing characteristics represents a single point together.

Figure 7:
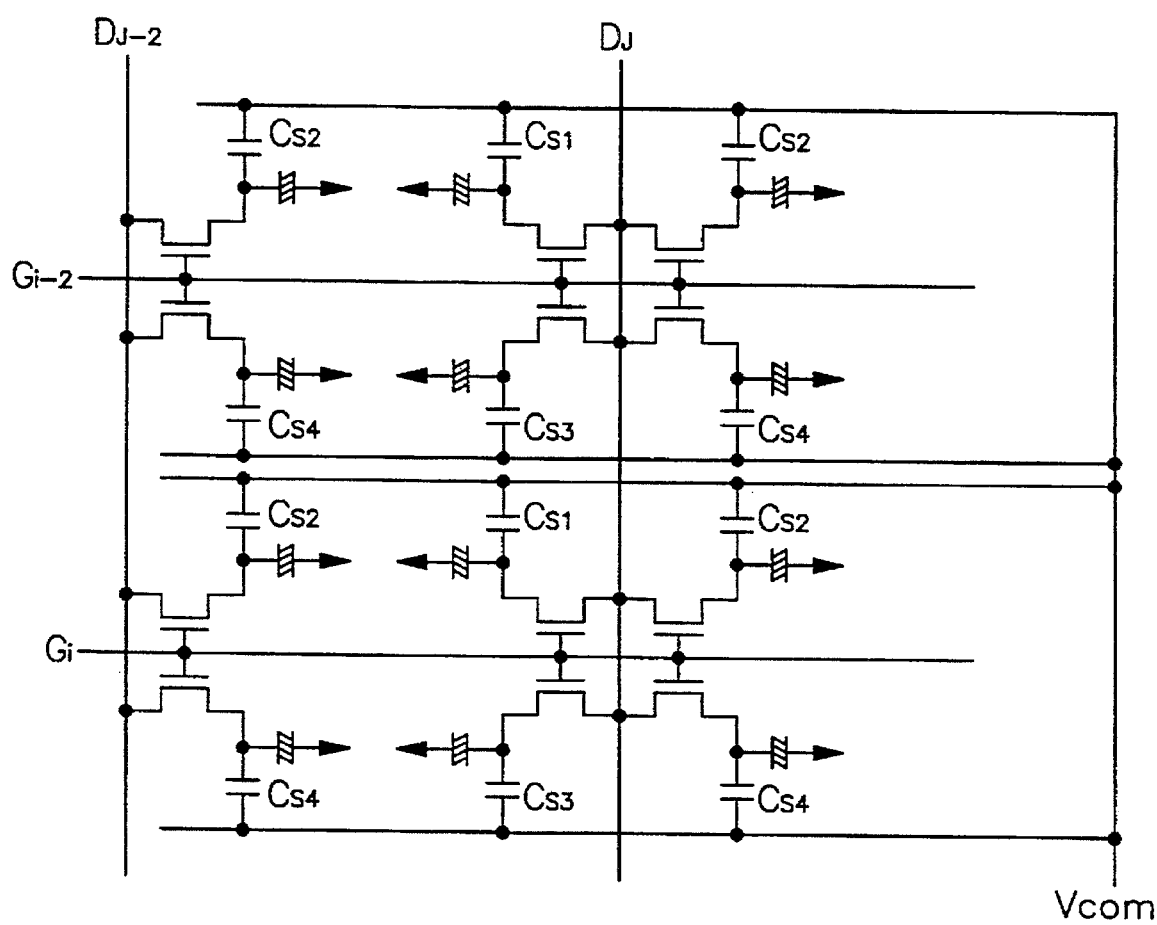

As shown in FIG. 7, a pair of a gate line and a data line define four pixels. Each pixel has one of the four storage capacitance values $C_{S1}$, $C_{S2}$, $C_{S3}$ and $C_{S4}$ and the contiguous pixels in a row or in a column have different storage capacitances. Two contiguous pixels with different storage capacitances in a column are connected to a gate line, and two contiguous pixels with different storage capacitances in a row are connected to a data line. The pixels in a row or in a column are connected to the same gate line or the same data line respectively. Since the pixels in the two row which are connected to a gate line are simultaneously activated and the pixels in the two column are connected to a data line, four pixels with different storage capacitances connected to a gate line and a data line are applied with the same data signal and thus the four pixels having different viewing characteristics represents a single point together.

Figure 8:
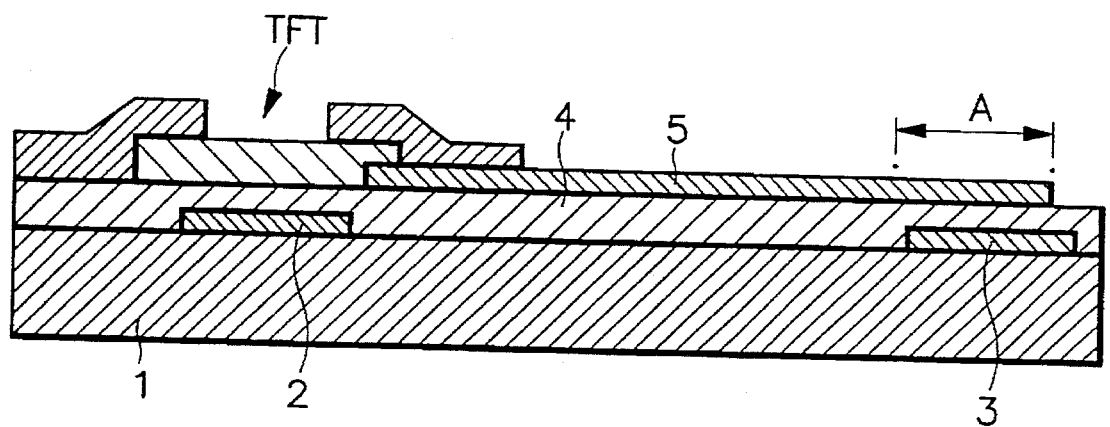
FIG. 8 is the cross-sectional view of a pixel according to the embodiments of the present invention.

As shown in FIG. 8, a storage capacitor includes a pixel electrode 5 and a storage electrode 3 which is formed simultaneously with gate lines and gate electrodes 2. An insulating layer 4 is put between the storage electrode 3 and the pixel electrode 5. Since the storage capacitance is proportional to the overlapped area A of the pixel electrode 5 and the storage electrode 3, the storage capacitance can be controlled by adjusting the overlapped area A.

Therefore, the viewing characteristics are improved without additional processes.

Now, the operation of the liquid crystal display according to the present invention will be described in case of FIG. 2.

The TFTs are activated in order of row by the gate signals transmitted through the gate lines $G_1, G_2, \ldots, G_i, \ldots$ and applied with data voltages transmitted through the data lines $D_1, D_2, \ldots, D_3, \ldots$ For convenience, the same data voltage is applied to all of the pixels. The storage capacitor with storage capacitance $C_{S1}$ and the liquid crystal capacitor with capacitance $C_{LC}$ in a pixel (i, j) which is connected to the gate line $G_i$ and the data line $D_j$ are charged, while the storage capacitor with storage capacitance $C_{S2}$ and the liquid crystal capacitor with capacitance $C_{LC}$ in a pixel (i, j−1).

The difference between the storage capacitances $C_{S1}$ and $C_{S2}$ results in the difference in the charging voltages and discharging rate of the voltages between the two storage capacitors. Therefore, the effective voltages applied to the liquid crystals are different between the two pixels (i, j) and (i, j−1) and the tilt angles of the liquid crystal molecules are different between the pixels (i, j) and (i, j−1). Consequently the transmission rate for the two pixels (i, j) and (i, j−1) becomes different from each other.

Since the contiguous pixels in the LCD according to the present invention has different light transmission characteristics and there exist hundreds of thousands of the pixels in an LCD, it seems that there exists a liquid crystal continuum having a transmission rate the value of which is the average of the two different transmission rates. In result, the viewing angle and the range of the inversion expand.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display, comprising:
   a plurality of pixel groups having at least one pixel, each pixel having a liquid crystal capacitor and a storage capacitor with a storage capacitance, wherein the pixels in one pixel group are contiguous, all the storage capacitances in the same pixel group are the same and at least two pixel groups have different storage capacitances.

2. The liquid crystal display according to claim 1, wherein the contiguous pixel groups have different storage capacitances.

3. The liquid crystal display according to claim 2, wherein the pixels are arranged in a matrix form.

4. The liquid crystal display according to claim 3, wherein each pixel group comprises the pixels in one row.

5. The liquid crystal display according to claim 4, the storage capacitance takes one of two values.

6. The liquid crystal display according to claim 3, wherein each pixel group comprises the pixels in one column.

7. The liquid crystal display according to claim 6, the storage capacitance takes one of two values.

8. The liquid crystal display according to claim 2, wherein each pixel group has only one pixel.

9. The liquid crystal display according to claim 8, wherein the pixels are arranged in a matrix form.

10. The liquid crystal display according to claim 9, wherein the storage capacitance takes one of two values.

11. The liquid crystal display according to claim 9, wherein the storage capacitance takes one of four values.

12. A liquid crystal display, comprising:

a plurality of pixels, each having a liquid crystal capacitor and a storage capacitor, and the capacitance of the storage capacitor in one pixel being different from the capacitance of the storage capacitor in the contiguous pixel;

a plurality of gate lines, connected to the pixels, for transmitting a gate signal to the pixels; and a plurality of data lines, connected to the pixels, for transmitting a data signal to the pixels.

13. The liquid crystal display according to claim 12, wherein the pixels are arranged in a matrix form.

14. The liquid crystal display according to claim 13, wherein each storage capacitor has one of two capacitances.

15. The liquid crystal display according to claim 14, wherein at least two of the pixels are connected to the same gate line and the same data line.

16. The liquid crystal display according to claim 12, wherein the storage capacitor has two ports, one of the ports is applied with the gate signal, and the other of the ports is applied with a common signal.

17. A thin film transistor array panel for liquid crystal display, comprising:

a plurality of pixel units, each of the pixel units having a thin film transistor with a first, a second and a third electrodes, a pixel electrode connected to the first electrode of the thin film transistor, and a storage electrode;

a plurality of gate lines, connected to the second electrodes of the thin film transistors, for transmitting gate signals; and a plurality of data lines, connected to the third electrodes of the thin film transistors, for transmitting data signals, wherein the pixel electrode and the storage electrode in the same pixel unit form a storage capacitor with a storage capacitance, and wherein the pixel units form a plurality of pixel groups with at least one of the pixel units, all the storage capacitances in the same pixel group have the same value, and the storage capacitances of at least two of the pixel groups are different from each other due to the difference in the overlapping area of the pixel electrode and the storage electrode between in the two pixel groups.

18. The panel according to claim 17, wherein the storage capacitance of the pixel group is different from the storage capacitance of the contiguous pixel group.

19. The panel according to claim 17, further comprising a storage capacitor line connected to the storage capacitors.

20. The panel according to claim 17, the storage capacitances are one of at least two values.

* * * * *